United States Patent
Hashimoto et al.

(10) Patent No.: US 7,672,574 B2
(45) Date of Patent: Mar. 2, 2010

(54) DATA BROADCAST PLAYBACK CONTROL DEVICE, DATA BROADCAST PLAYBACK CONTROL METHOD DATA BROADCAST PLAYBACK CONTROL PROGRAM, AND RECORDING MEDIUM RECORDING PROGRAM THEREON

(75) Inventors: Koji Hashimoto, Takatsuki (JP); Yasushi Yoneda, Ikeda (JP)

(73) Assignee: Panasonic Corporation, Osaka (JP)

( * ) Notice: Subject to any disclaimer, the term of this patent is extended or adjusted under 35 U.S.C. 154(b) by 1298 days.

(21) Appl. No.: 10/538,059

(22) PCT Filed: Mar. 9, 2004

(86) PCT No.: PCT/JP2004/003024
§ 371 (c)(1),
(2), (4) Date: Jun. 9, 2005

(87) PCT Pub. No.: WO2004/082178
PCT Pub. Date: Sep. 23, 2004

(65) Prior Publication Data
US 2006/0248561 A1   Nov. 2, 2006

(30) Foreign Application Priority Data
Mar. 11, 2003   (JP) .............................. 2003-064878

(51) Int. Cl.
H04N 7/26  (2006.01)
H04N 5/91  (2006.01)
(52) U.S. Cl. ........................................ 386/124; 386/46
(58) Field of Classification Search .................... 386/46
See application file for complete search history.

(56) References Cited
U.S. PATENT DOCUMENTS
5,343,239 A   8/1994 Lappington et al.
5,526,035 A   6/1996 Lappington et al.
2003/0149886 A1*  8/2003 Ito et al. ..................... 713/193

FOREIGN PATENT DOCUMENTS
EP   1049331   11/2000

(Continued)

OTHER PUBLICATIONS

An article by Y. Watanabe et al. at p. 73 of 2003 Nen The Institute of Electronics, Information and Communication Engineers Sogo Taikai Koen, Ronbunshu, Joho System 2, The institute of Electronics, Information and Communication Engineers, (Mar. 3, 2001), entitled "MPEG-2TS Kiroku ni yoru Trick Play no Ichi Shuho".

(Continued)

Primary Examiner—Marsha D Banks Harold
Assistant Examiner—Oluwaseun A Adegeye
(74) Attorney, Agent, or Firm—Greenblum & Bernstein, P.L.C.

(57) ABSTRACT

During reception of data broadcast, the control information is created by a control information creator for storage into a first storage. During normal reproduction of the data content stored in the first storage, the data content of the data broadcast being reproduced and the control information are stored in a second storage. During special reproduction of the data content stored in the first storage or after the special reproduction is stopped, the control information stored in the second storage is compared with the control information read out from the first storage during the special reproduction or after the special reproduction is stopped. When the control information stored in the second storage and the control information read out from the first storage coincide with each other, the data broadcast continues to be reproduced using the data content stored in the second storage.

22 Claims, 10 Drawing Sheets

FOREIGN PATENT DOCUMENTS

| | | |
|---|---|---|
| EP | 1052851 | 11/2000 |
| EP | 1061738 | 12/2000 |
| JP | 7-505020 | 6/1995 |
| JP | 8-79710 | 3/1998 |
| JP | 10-322672 | 4/1998 |
| JP | 2000-358217 | 12/2000 |
| JP | 2001-257989 | 9/2001 |
| JP | 2001-352517 | 12/2001 |
| JP | 2002-77820 | 3/2002 |
| JP | 2002-369137 | 12/2002 |
| JP | 2003-143522 | 5/2003 |
| WO | 93/10605 | 5/1993 |
| WO | 00/11864 | 3/2000 |
| WO | 00/27113 | 5/2000 |

OTHER PUBLICATIONS

An article by K. Morioka et al. at pp. 71-76 of The Institute of Electronics, Information and Communication Engineers Gijutsu Kenkyu Hokoku, vol. 100, No. 679, The Institute of Electronics, Information and Communication Engineers (Aug. 17, 2001), entitled "Stream no Kuroku Tokushu Saisei ni Taio Shita MPEG 2 MP@HL Decoder LSI".

An article by S. Nabeshima et al., at pp. 236-251 of Lecture Notes in Computer Science, Proceedings of Advanced Multimedia Content Processing, First International Conference, vol. 1554, Springer, 1999, entitled "Extended Digital Video Broadcasting with Time-Lined Hypermedia".

An article by Y. Kusumi et al., at pp. 588-589 of 1998 Nen The Institute of Electronics, Information and Communication Engineers Sogo Taikai Koen Ronbunshu, Joho System 2, The Institute of Electronics, Information and Communication Engineers (Mar. 6, 1998), entitled "Digital Hoso ni okeru Intractive TV System DVX no Contents Hyogen to Sono Seisaku Denso".

An article by K. Sumiya et al., at pp. 23-30 of Joho Shori Symposium Ronbunshu, Advanced Database Symposium '97, vol. 97, No. 11, Information Processing Society of Japan (Dec. 15, 1997), entitled "Digital Hoso Interactive Data Haishin no tame no Carouselgata Soshutsu Hoshiki DVX to sono Oyo".

\* cited by examiner

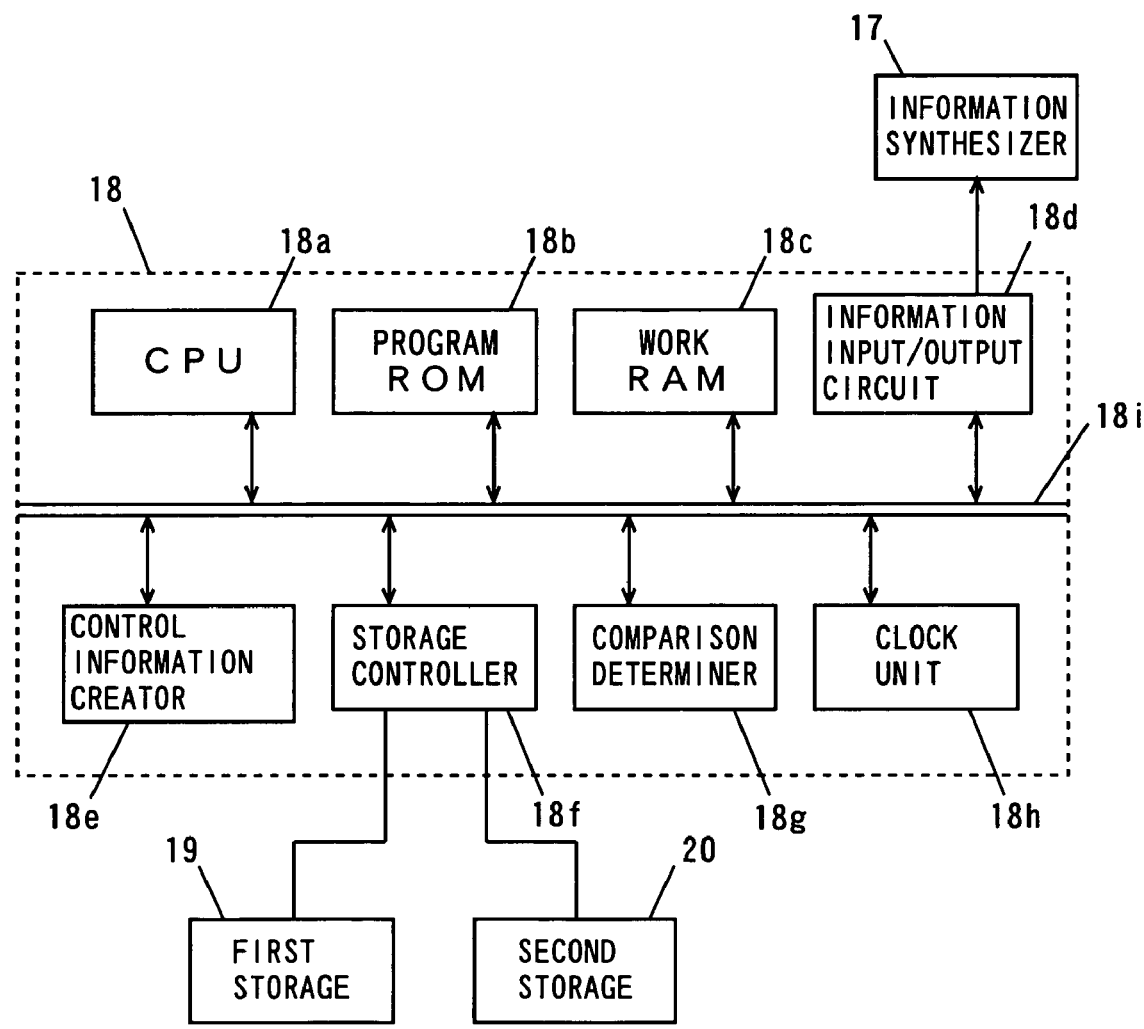
F I G. 2

DATA BROADCAST PLAYBACK CONTROL DEVICE, DATA BROADCAST PLAYBACK CONTROL METHOD DATA BROADCAST PLAYBACK CONTROL PROGRAM, AND RECORDING MEDIUM RECORDING PROGRAM THEREON

TECHNICAL FIELD

The present invention relates to a data broadcast reproduction controller, a method for controlling data broadcast reproduction, a data broadcast reproduction control program, and a recording medium recording the same.

BACKGROUND ART

In the digital broadcast service, data broadcasting is available along with television or audio broadcasting. A data broadcast reproduction controller for recording and reproducing data broadcast has been developed (JP 2001-257989 A, for example).

The data broadcast reproduction controller has functions of receiving data broadcast and recording data content of the received data broadcast, and also reproducing the recorded data content of the data broadcast.

With such a data broadcast reproduction controller, the data broadcast can be special-reproduced, such as fast-forwarding or fast-rewinding. As a method for the special-reproduction of pictures, a method has been proposed, for example, in which only an I-picture is detected from a video stream for frame advance of still pictures.

In the special reproduction of data broadcast, however, the control information related to data broadcast is missing from a TS (Transport Stream) packet. For this reason, after the special reproduction of data broadcast, it is necessary to reboot the data broadcast in order to reacquire the data content thereof.

One possible approach for this is to control the reproduction of data broadcast, by utilizing the version information of data broadcast described in SIT (Selection Information Table) of a partial TS packet. The cycle of delivering SIT, however, is as long as about three seconds, so that it is insufficient to control the reproduction of the data broadcast after the special reproduction.

As stated above, in the conventional data broadcast reproduction controller, the data broadcast is rebooted for each special reproduction, so that after special reproduction, the data broadcast is reproduced again from its beginning. Therefore, in order for a user to view a continuation of the data broadcast that he or she has been viewing before the special reproduction, he or she needs to perform again, at the end of the special reproduction, operation procedures that have been done before the special reproduction. The user cannot view the data broadcast during the special reproduction of the data broadcast.

It is also necessary to reacquire the data content of data broadcast when the user switches a receiving channel to another one, and then returns the channel to the original one while receiving a particular channel of the data broadcast. Therefore, for the user to view a continuation of the data broadcast that he or she has been viewing before switching a channel, the user is required to perform again the operation procedures done before the switching of the channel.

DISCLOSURE OF INVENTION

It is an object of the present invention to provide a data broadcast reproduction controller, a method for controlling the reproduction of data broadcast, a data broadcast reproduction control program, and a recording medium recording the same enabling the data broadcast that has been viewed during first reproduction to be continuously viewed during second reproduction.

It is another object of the present invention to provide a data broadcast reproduction controller, a method for controlling the reproduction of data broadcast, a data broadcast reproduction control program, and a recording medium recording the same enabling the data broadcast that has been viewed during first reception to be continuously viewed during second reception.

A data broadcast reproduction controller according to one aspect of the present invention for controlling the reproduction of data broadcast including one or more data contents, comprises: a receiver that receives data content of data broadcast and related information attached to the data broadcast; a first storage that stores the data content of the data broadcast received by the receiver; a reproducer that reproduces the data content of the data broadcast stored in the first storage; a control information creator that creates control information for identifying the data content of the data broadcast based on given information included in the data content of the data broadcast received by the receiver or reproduced by the reproducer and/or the related information; a second storage that stores, during first reproduction by the reproducer, the data content of the data broadcast acquired from the first storage and control information corresponding to the data content; a determiner that determines, during a second reproduction by the reproducer, whether or not the control information stored in the second storage and the control information corresponding to the data content of the data broadcast to be reproduced coincide with each other; and a controller that controls the reproducer to reproduce the data broadcast, using the data content stored in the second storage, when the determiner determines that the control information stored in the second storage and the control information corresponding to the data content of the data broadcast to be reproduced coincide with each other.

In the data broadcast reproduction controller according to the present invention, the data content of data broadcast and the related information attached to the data broadcast are received, and the data content of the received data broadcast is stored in the first storage. In addition, the data content of the data broadcast stored in the first storage is reproduced. Based on the given information included in the data content of the received or reproduced data broadcast and/or the related information, the control information for identifying the data content of data broadcast is created.

During the first reproduction, the data content of the data broadcast acquired from the first storage and the control information corresponding to the data content is stored in the second storage. During the second reproduction, it is determined whether or not the control information stored in the second storage and the control information corresponding to the data content of the data broadcast to be reproduced coincide with each other. When the control information stored in the second storage and the control information corresponding to the data content of the data broadcast to be reproduced coincide with each other, the data broadcast is reproduced, using the data content stored in the second storage.

In this manner, during the second reproduction, the data broadcast is reproduced using the data content of the data broadcast stored in the second storage, so that a user can view the data broadcast he or she has been viewing during the first reproduction continuously during the second reproduction.

The control information creator may create control information based on given information included in the data content of the data broadcast received by the receiver and/or the related information, and store the created control information to the first storage.

In this case, the control information is created based on the given information included in the data content of the received data broadcast and/or the related information, and the created control information is stored in the first storage.

The control information creator may create control information based on given information included in the data content of the data broadcast received by the receiver and/or the related information.

In this case, the control information is created at the time of a change in at least some of the information of the received data broadcast or at given update timing.

The control information creator may store, during the first reproduction by the reproducer, the data content of the data broadcast acquired from the first storage and the control information corresponding to the data content into the second storage.

In this case, during the first reproduction, the data content of the data broadcast acquired from the first storage and the control information corresponding to the data content are stored in the second storage.

The determiner may determine, during the second reproduction by the reproducer, whether or not the control information stored in the second storage and the control information stored in the first storage coincide with each other.

In this case, it is determined, during the second reproduction, whether or not the control information stored in the second storage and the control information stored in the first storage coincide with each other.

The control information creator may store, at the time of a change in at least some of the information of the data broadcast reproduced during the first reproduction by the reproducer, the data content of the data broadcast acquired from the first storage and the control information corresponding to the data content into the second storage.

In this case, when at least some of the information of the data broadcast reproduced during the first reproduction has changed, the data content of the data broadcast acquired from the first storage and the control information corresponding to the data content are stored in the second storage.

The determiner may determine, during the second reproduction by the reproducer, whether or not the control information stored in the second storage and the control information stored in the first storage coincide with each other.

In this case, it is determined, during the second reproduction, whether or not the control information stored in the second storage and the control information stored in the first storage coincide with each other.

The control information creator may, during the first reproduction by the reproducer, create control information based on given information included in the data content of the data broadcast acquired from the first storage and/or the related information, and store the created control information into the second storage.

In this case, during the first reproduction, the control information is created based on the given information included in the data content of the data broadcast acquired from the first storage and/or the related information, for storage into the second storage.

The control information creator may store, at the time of a change in at least some of the information of the data broadcast reproduced during the first reproduction by the reproducer, the data content of the data broadcast acquired from the first storage and the control information corresponding to the data content into the second storage.

In this case, when at least some of the information of the data broadcast reproduced during the first reproduction has changed, the data content of the data broadcast acquired from the first storage and the control information corresponding to the data content are stored into the second storage.

The control information creator may create, during the second reproduction by the reproducer, control information based on given information included in the data content of the data broadcast acquired from the first storage and/or the related information, and the determiner may determine, during the second reproduction by the reproducer, whether or not the control information stored in the second storage and the control information created by the control information creator coincide with each other.

In this case, during the second reproduction, the control information is created based on the given information included in the data content of the data broadcast acquired from the first storage and/or the related information, and it is determined whether or not the control information stored in the second storage and the control information created by the control information creator coincide with each other.

The second reproduction may include reproduction at a different speed from that of the first reproduction. In this case, the user can view, during and after special reproduction at a different speed from that of the first reproduction, the data broadcast he or she has been viewing before the special reproduction.

The given information included in the data content of data broadcast and/or the related information may include content-reference information described in a data script. In this case, control information is created based on the content-reference information described in the data script.

A data broadcast reproduction controller according to another aspect of the present invention for controlling the reproduction of data broadcast including one or more data contents comprises: a receiver that receives the data content of data broadcast and related information attached to the data broadcast; a first storage that stores the data content of the data broadcast received by the receiver; a reproducer that reproducers the data content of the data broadcast received by the receiver; a control information creator that creates control information for identifying the data content of the data broadcast based on given information included in the data content of the data broadcast received by the receiver and/or the related information; a second storage that stores, during first reception by the receiver, the data content of the data broadcast acquired from the first storage and the control information corresponding to the data content; a determiner that determines, during second reception by the receiver, whether or not the control information stored in the second storage and the control information corresponding to the data content of the data broadcast received by the receiver coincide with each other; and a controller that controls the reproducer to reproduce data broadcast, using the data content stored in the second storage, when the determiner determines that the control information stored in the second storage and the control information corresponding to the data content of the data broadcast received by the receiver coincide with each other.

In the data broadcast reproduction controller according to the present invention, the data content of data broadcast and the related information attached to the data broadcast are received, and the data content of the received data broadcast is stored in the first storage. In addition, the data content of the received data broadcast is reproduced. Based on the given information included in the data content of the received data broadcast and/or the related information, the control information for identifying the data content of data broadcast is created.

During the first reception, the data content of the data broadcast received from the first storage and the control information corresponding to the data content are stored in the second storage. During the second reception, it is determined whether or not the control information stored in the second storage and the control information corresponding to the data content of the received data broadcast coincide with each other. When the control information stored in the second storage and the control information corresponding to the data content of the received data broadcast coincide with each other, the data broadcast is reproduced, using the data content stored in the second storage.

In this manner, during the second reception, the data broadcast can be reproduced using the data content stored in the second storage, so that the user can view the data broadcast he or she has been viewing during the first reception continuously during the second reception.

The control information creator may create control information at the time of a change in at least some of the information of the data broadcast received by the receiver during the first reception by the receiver.

In this case, the control information is created at the time of a change in some of the information of the data broadcast received during the first reception.

The first reception may take place before a receiving channel is changed, and the second reception may take place after the receiving channel is changed.

In this case, the data broadcast can be reproduced, using the data content stored in the second storage after the receiving channel is changed, so that the user can view, after the receiving channel is changed, the data broadcast he or she has been viewing before the channel change.

The given information included in the data content of data broadcast and/or the related information may include content-reference information described in a data script.

In this case, control information is created based on the content-reference information described in the data script.

A method for controlling the reproduction of data broadcast including one or more data contents according to still another aspect of the present invention comprises the steps of: receiving data content of data broadcast and related information attached to the data broadcast; storing the data content of the received data broadcast into a first storage; reproducing the data content of the data broadcast stored in the first storage; creating control information for identifying the data content of the data broadcast based on given information included in the data content of the received or reproduced data broadcast and/or the related information; storing, during first reproduction, the data content of the data broadcast acquired from the first storage and the control information corresponding to the data content into a second storage; determining, during second reproduction, whether or not the control information stored in the second storage and the control information corresponding to the data content of data broadcast to be reproduced coincide with each other; and controlling the reproduction such that the data broadcast is reproduced, using the data content stored in the second storage, when it is determined that the control information stored in the second storage and the control information corresponding to the data content of the data broadcast to be reproduced coincide with each other.

In the method for controlling data broadcast reproduction according to the present invention, the data content of data broadcast and the related information attached to the data broadcast are received, and the data content of the received data broadcast is stored in the first storage. In addition, the data content of the data broadcast stored in the first storage is reproduced. Based on the given information included in the data content of the received or reproduced data broadcast and/or the related information, the control information for identifying the data content of the data broadcast is created.

During the first reproduction, the data content of the data broadcast acquired from the first storage and the control information corresponding to the data content are stored in the second storage. During the second reproduction, it is determined whether or not the control information stored in the second storage and the control information corresponding to the data content of the data broadcast to be reproduced coincide with each other. When the control information stored in the second storage and the control information corresponding to the data content of the data broadcast to be reproduced coincide with each other, the data broadcast is reproduced, using the data content stored in the second storage.

In this manner, during the second reproduction, the data broadcast is reproduced using the data content of the data broadcast stored in the second storage, so that the user can view the data broadcast he or she has been viewing during the first reproduction continuously during the second reproduction.

A method for controlling the reproduction of data broadcast including one or more data contents according to yet another aspect of the present invention comprises the steps of: receiving data content of data broadcast and related information attached to the data broadcast; storing the data content of the received data broadcast into a first storage; reproducing the data content of the received data broadcast; creating control information for identifying the data content of the data broadcast based on given information included in the data content of the received data broadcast and/or the related information; storing, during first reception, the data content of the data broadcast acquired from the first storage and the control information corresponding to the data content into a second storage; determining, during second reception, whether or not the control information stored in the second storage and the control information corresponding to the data content of the received data broadcast coincide with each other; and controlling the reproduction such that the data broadcast is reproduced, using the data content stored in the second storage, when it is determined that the control information stored in the second storage and the control information corresponding to the data content of the received data broadcast coincide with each other.

In the method for controlling data broadcast reproduction according to the present invention, the data content of data broadcast and the related information attached to the data broadcast are received, and the data content of the received data broadcast is stored in the first storage. In addition, the data content of the received data broadcast is reproduced. Based on the given information included in the data content of the received data broadcast and/or the related information, the control information for identifying the data content of the data broadcast is created.

During the first reception, the data content of the data broadcast received from the first storage and the control information corresponding to the data content are stored in the second storage. During the second reception, it is determined whether or not the control information stored in the second storage and the control information corresponding to the data content of the received data broadcast coincide with each other. When the control information stored in the second storage and the control information corresponding to the data content of the received data broadcast coincide with each other, the data broadcast is reproduced, using the data content stored in the second storage.

In this manner, during the second reproduction, the data broadcast is reproduced using the data content of the data broadcast stored in the second storage, so that the user can view the data broadcast he or she has been viewing during the first reproduction continuously during the second reproduction.

A data broadcast reproduction control program according to still another aspect of the present invention, which is executable by a computer and controls the reproduction of data broadcast including one or more data contents, allows the computer to execute the processes of: receiving data content of data broadcast and related information attached to the data broadcast; storing the data content of the received data broadcast into a first storage; reproducing the data content of the data broadcast stored in the first storage; creating control information for identifying the data content of the data broadcast based on given information included in the data content of the received or reproduced data broadcast and/or the related information; storing, during first reproduction, the data content of the data broadcast acquired from the first storage and the control information corresponding to the data content into a second storage; determining, during second reproduction, whether or not the control information stored in the second storage and the control information corresponding to the data content of data broadcast to be reproduced coincide with each other; and controlling the reproduction such that the data broadcast is reproduced, using the data content stored in the second storage, when it is determined that the control information stored in the second storage and the control information corresponding to the data content of the data broadcast to be reproduced coincide with each other.

In the data broadcast reproduction control program according to the present invention, the data content of data broadcast and the related information attached to the data broadcast are received, and the data content of the received data broadcast is stored in the first storage. In addition, the data content of the data broadcast stored in the first storage is reproduced. Based on the given information included in the data content of the received or reproduced data broadcast and/or the related information, the control information for identifying the data content of the data broadcast is created.

During the first reproduction, the data content of the data broadcast acquired from the first storage and the control information corresponding to the data content are stored in the second storage. During the second reproduction, it is determined whether or not the control information stored in the second storage and the control information corresponding to the data content of the data broadcast to be reproduced coincide with each other. When the control information stored in the second storage and the control information corresponding to the data content of the data broadcast to be reproduced coincide with each other, the data broadcast is reproduced, using the data content stored in the second storage.

In this manner, during the second reproduction, the data broadcast is reproduced using the data content of the data broadcast stored in the second storage, so that the user can view the data broadcast he or she has been viewing during the first reproduction continuously during the second reproduction.

A data broadcast reproduction control program according to yet another aspect of the present invention, which is executable by a computer and controls the reproduction of data broadcast including one or more data contents, allows the computer to execute the processes of: receiving data content of data broadcast and related information attached to the data broadcast; storing the data content of the received data broadcast into a first storage; reproducing the data content of the received data broadcast; creating control information for identifying the data content of the data broadcast based on given information included in the data content of the received data broadcast and/or the related information; storing, during first reception, the data content of the data broadcast acquired from the first storage and the control information corresponding to the data content into a second storage; determining, during second reception, whether or not the control information stored in the second storage and the control information corresponding to the data content of the received data broadcast coincide with each other; and controlling the reproduction such that the data broadcast is reproduced, using the data content stored in the second storage, when it is determined that the control information stored in the second storage and the control information corresponding to the data content of the received data broadcast coincide with each other.

In the data broadcast reproduction control program according to the present invention, the data content of data broadcast and the related information attached to the data broadcast are received, and the data content of the received data broadcast is stored in the first storage. In addition, the data content of the received data broadcast is reproduced. Based on the given information included in the data content of the received data broadcast and/or the related information, the control information for identifying the data content of the data broadcast is created.

During the first reception, the data content of the data broadcast received from the first storage and the control information corresponding to the data content are stored in the second storage. During the second reception, it is determined whether or not the control information stored in the second storage and the control information corresponding to the data content of the received data broadcast coincide with each other. When the control information stored in the second storage and the control information corresponding to the data content of the received data broadcast coincide with each other, the data broadcast is reproduced, using the data content stored in the second storage.

In this manner, during the second reproduction, the data broadcast is reproduced using the data content of the data broadcast stored in the second storage, so that the user can view the data broadcast he or she has been viewing during the first reproduction continuously during the second reproduction.

A computer-readable recording medium according to still another aspect of the present invention in which a data broadcast reproduction control program for controlling the reproduction of data broadcast including one or more data contents is recorded, the data broadcast reproduction control program allowing the computer to execute the processes of: receiving data content of data broadcast and related information attached to the data broadcast; storing the data content of the received data broadcast into a first storage; reproducing the data content of the data broadcast stored in the first storage; creating control information for identifying the data content of the data broadcast based on given information included in the data content of the received or reproduced data broadcast and/or the related information; storing, during first reproduction, the data content of the data broadcast acquired from the first storage and the control information corresponding to the data content into a second storage; determining, during second reproduction, whether or not the control information stored in the second storage and the control information cor- responding to the data content of data broadcast to be reproduced coincide with each other; and controlling the reproduction such that the data broadcast is reproduced, using the data content stored in the second storage, when it is determined that the control information stored in the second storage and the control information corresponding to the data content of the data broadcast to be reproduced coincide with each other.

In the data broadcast reproduction control program recorded in the recording medium according to the present invention, the data content of data broadcast and the related information attached to the data broadcast are received, and the data content of the received data broadcast is stored in the first storage. In addition, the data content of the data broadcast stored in the first storage is reproduced. Based on the given information included in the data content of the received or reproduced data broadcast and/or the related information, the control information for identifying the data content of the data broadcast is created.

During the first reproduction, the data content of the data broadcast acquired from the first storage and the control information corresponding to the data content are stored in the second storage. During the second reproduction, it is determined whether or not the control information stored in the second storage and the control information corresponding to the data content of the data broadcast to be reproduced coincide with each other. When the control information stored in the second storage and the control information corresponding to the data content of the data broadcast to be reproduced coincide with each other, the data broadcast is reproduced, using the data content stored in the second storage.

In this manner, during the second reproduction, the data broadcast is reproduced using the data content of the data broadcast stored in the second storage, so that the user can view the data broadcast he or she has been viewing during the first reproduction continuously during the second reproduction.

A computer-readable recording medium according to yet another aspect of the present invention in which a data broadcast reproduction control program for controlling the reproduction of data broadcast including one or more data contents is recorded, the data broadcast reproduction control program allowing the computer to execute the processes of: receiving data content of data broadcast and related information attached to the data broadcast; storing the data content of the received data broadcast into a first storage; reproducing the data content of the received data broadcast; creating control information for identifying the data content of the data broadcast based on given information included in the data content of the received data broadcast and/or the related information; storing, during first reception, the data content of the data broadcast acquired from the first storage and the control information corresponding to the data content into a second storage; determining, during second reception, whether or not the control information stored in the second storage and the control information corresponding to the data content of the received data broadcast coincide with each other; and controlling the reproduction such that the data broadcast is reproduced, using the data content stored in the second storage, when it is determined that the control information stored in the second storage and the control information corresponding to the data content of the received data broadcast coincide with each other.

In the data broadcast reproduction control program recorded in the recording medium according to the present invention, the data content of data broadcast and the related information attached to the data broadcast are received, and the data content of the received data broadcast is stored in the first storage. In addition, the data content of the received data broadcast is reproduced. Based on the given information included in the data content of the received data broadcast and/or the related information, the control information for identifying the data content of the data broadcast is created.

During the first reception, the data content of the data broadcast received from the first storage and the control information corresponding to the data content are stored in the second storage. During the second reception, it is determined whether or not the control information stored in the second storage and the control information corresponding to the data content of the received data broadcast coincide with each other. When the control information stored in the second storage and the control information corresponding to the data content of the received data broadcast coincide with each other, the data broadcast is reproduced, using the data content stored in the second storage.

In this manner, during the second reproduction, the data broadcast is reproduced using the data content of the data broadcast stored in the second storage, so that the user can view the data broadcast he or she has been viewing during the first reproduction continuously during the second reproduction.

BRIEF DESCRIPTION OF DRAWINGS

FIG. 2 is a block diagram showing the structure of the input/output information controller in the data broadcast reproduction controller of FIG. 1:

BEST MODE FOR CARRYING OUT THE INVENTION (1) First Embodiment

Figure 1:
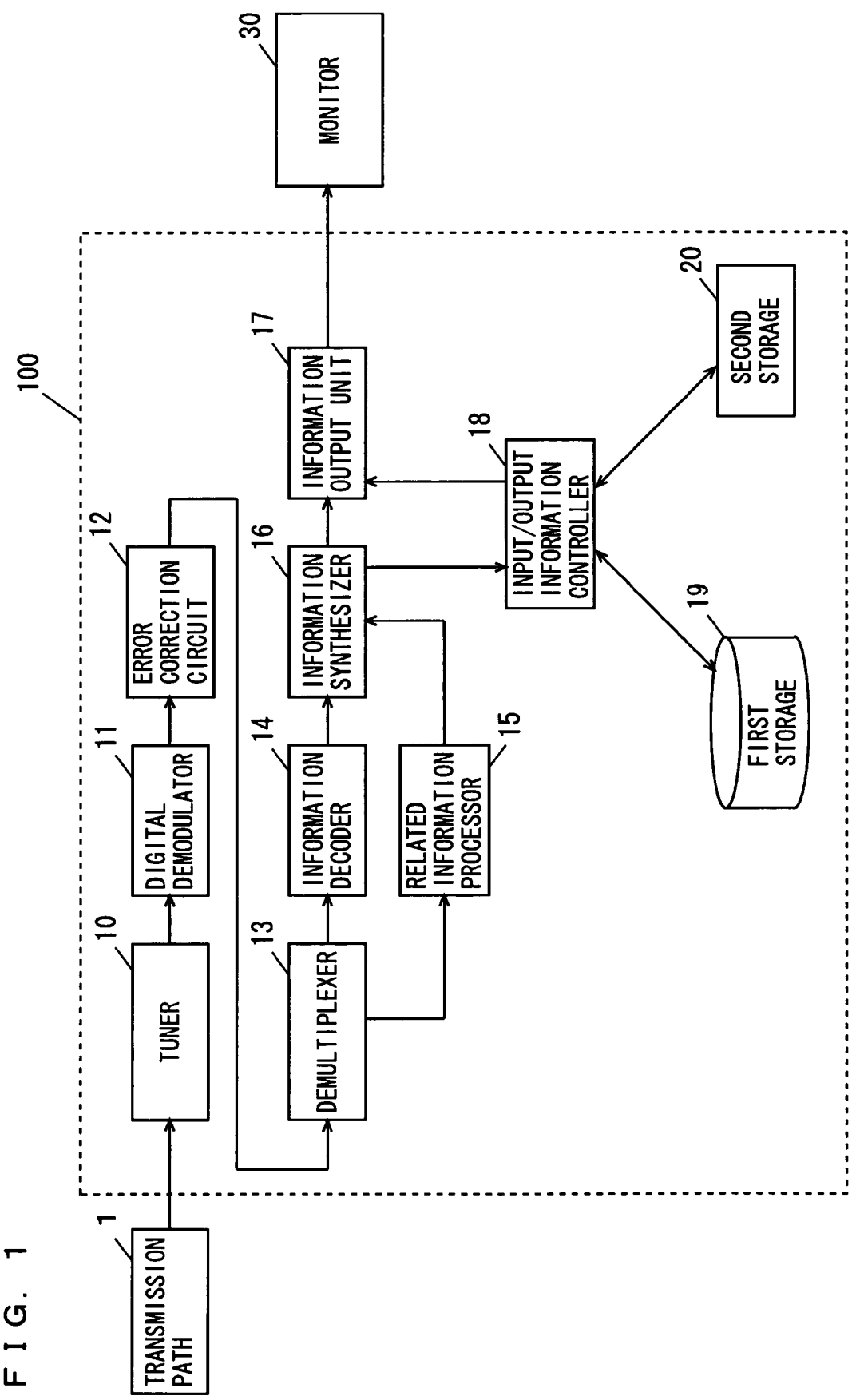
FIG. 1 is a block diagram showing the structure of a digital broadcast receiver that includes a data broadcast reproduction controller according to a first embodiment of the present invention.

FIG. 1 is a block diagram showing the configuration of a digital broadcast receiver that includes a data broadcast reproduction controller according to a first embodiment of the present invention.

The digital broadcast receiver of FIG. 1 comprises a data broadcast reproduction controller 100 and a monitor 30. The data broadcast reproduction controller 100 includes a tuner 10, a digital demodulator 11, an error correction circuit 12, a demultiplexer 13, an information decoder 14, a related information processor 15, an information synthesizer 16, an information output unit 17, an input/output information controller 18, a first storage 19, and a second storage 20.

In digital broadcasting, the contents of television or audio broadcast and data broadcast are transmitted through a transmission path 1. The content of the data broadcast will be referred to as data content.

The tuner 10 receives television or audio broadcast and data broadcast, and tunes to a digital-demodulated broadcast signal corresponding to the channel selected by a user. The digital demodulator 12 demodulates the digital-demodulated broadcast signal to a multiplexed signal. The error correction circuit 12 corrects data errors which occur in the transmission path and digital demodulator 12.

The demultiplexer 13 separates the multiplexed digital signal into encoded video, audio, and data signals and related information. Note that the related information includes such information as Electronic Program Guide (EPG) The information decoder 14 decodes the encoded video, audio, and data signals. The related information processor 15 analyzes the related information supplied from the demultiplexer 13.

The information synthesizer 16 synthesizes the video signal, audio signal, and data signal supplied from the information decoder 14 as well as the related information supplied from the related information processor 15 for creation of an image. The information output unit 17 outputs the synthesized video, audio, and data signals, and related information to the monitor 30. The monitor 30 displays pictures of the television or audio broadcast and the data broadcast while outputting sounds, based on the synthesized video, audio, and data signals, and related information.

Note also that the information synthesizer 16 supplies the data content of the data broadcast that includes a video signal, an audio signal, and a data signal to the input/output information controller 18, and creates program information, supplying the program information to the input/output information controller 18.

The input/output information controller 18 creates control information related to data broadcast based on the data content, program information, and information included in time information described below which were supplied from the information synthesizer 16. The control information will later be detailed. This input/output information controller 18 supplies the first storage 19 with the created control information along with the data content including the video signal, audio signal, and data signal, while supplying the second storage 20 with the control information and data content.

The first storage 19, which is composed of a hard disc, for example, stores the data content of the data broadcast to be recorded, the control information related to the data broadcast, and the like. The second storage 20, which is composed of a RAM (Random Access Memory), for example, temporarily stores the data content of the data broadcast being reproduced, the control information related to the data broadcast, and the like. The access speed of the second storage 20 is higher than that of the first storage 19.

Following description in this embodiment will be given of the recording and reproduction of data broadcast, although the content of television or audio broadcast may instead be recorded into the first storage 19 for reproduction.

FIG. 2 is a block diagram showing the configuration of the input/output information controller 18 in the data broadcast reproduction controller 100 of FIG. 1.

In FIG. 2, the input/output information controller 18 includes a CPU (Central Processing Unit) 18a, a program ROM (Read Only Memory) 18b, a work RAM (Random Access Memory) 18c, an information input/output circuit 18d, a control information creator 18e, a storage controller 18f, a comparison determiner 18g, and a clock unit 18h. The CPU 18a, program ROM 18b, work RAM 18c, information input/output circuit 18d, control information creator 18e, storage controller 18f, comparison determiner 18g, and clock unit 18h are connected to a system bus 18i for data transmission.

The program ROM 18b stores a data broadcast reproduction control program. The CPU 18a writes, reads, retrieves, and computes a variety of data in accordance with the data broadcast reproduction control program stored in the program ROM 18b, while controlling each component inside the input/output information controller 18. The work RAM 18c temporarily stores a variety of data when the CPU 18a performs computations and control.

The information input/output circuit 18d receives and transfers the data content, control information, and the like between the information synthesizer 17 and the system bus 18i. The data content include a data script for data transmission.

The control information creator 18e creates control information based on information included in the data content input via the information input/output circuit 18d and the program information as well as the time information. More specifically, the control information creator 18e creates control information based on any combination of content-reference information described in the data script of the data broadcast and the time information created by the clock unit 18h described below. The method of creating the control information will later be detailed.

The storage controller 18f writes the data content of the data broadcast input via the information input/output circuit 18d, the control information related to the data broadcast created by the control information creator 18e, and the like to the first storage 19 or second storage 20 or reads out the data content, the control information, and the like stored in the first storage 19 or second storage 20. In addition, the storage controller 18f writes the data content of the data broadcast currently being reproduced and the control information related to the data broadcast to the second storage 20 or reads out the data content of the data broadcast and the control information stored in the second storage 20.

The comparison determiner 18g acquires the control information created by the control information creator 18e, while detecting a change in given information included in the data content of the data broadcast currently receiving and/or the related information, thereby controlling the control information creator 18e based on the detection result. In addition, the comparison determiner compares the control information related to the data broadcast currently being reproduced with the control information stored in the second storage 20. When these informations coincide with each other, it continues the reproduction of the data broadcast using the data content stored in the second storage 20, whereas, when these do not coincide with each other, rebooting the data broadcast. Note that the rebooting of data broadcast means to reproduce data broadcast from its beginning through the acquisition of the data content stored in the first storage 19.

The clock unit 18h calculates the current time based on the electronic program guide and the like included in the related information to create time information.

In this embodiment, during reception of data broadcast, the control information related to the data broadcast thus created is stored, along with the data content, in the first storage 19.

The control information related to the data broadcast will now be described. The control information uniquely identifies each of one or more data contents included in the data broadcast that is being received by the data broadcast reproduction controller 100.

This control information is created using SI (Service Information) or PSI (Program Specific Information), i.e., the program information created by the information synthesizer 16. More specifically, it is created using in part or all of a value of Module ID (module identifier) or Module Version of DII (Download Info Indication Message); time information of TOT (Time Offset Table); time information created by the clock unit 18*h*; version information of PMT (Program Map Table); Service ID (service identifier); Network ID (network identifier); Transport stream ID, and the like.

Note that DII is transmission control information indicating a module structure, including Module ID, Module Version, and the like. TOT is a type of SI, indicating information on the current time and time difference when summer time is in effect. PMT is a type of PSI, indicating PID (Packet Identifier), stream type identifier and the like of components (pictures, sounds, and data) constituting a production channel. The service ID is a unique number to distinguish a production channel. The Network ID is a unique number to distinguish a network. The Transport stream ID is a unique number to distinguish a transport stream.

Alternatively, the control information may be created using in part or all of the date/time described in the data script and timer information indicating the current time; URI (Uniform Resource Indicator); content information to which reference is made by the data broadcast, such as still pictures, motion pictures, sounds, PNG (Portable Network Graphics), MNG (Multiple-image Network Graphics), and 8-unit code, constituting the screen; event information from a broadcast station notifying updates of the data broadcast being reproduced, and the like.

Note that URI indicates addressing to an object on the Internet. PNG and MNG are graphic symbols.

The control information thus created is stored, along with the time information created by the clock unit 18*h*, into the first storage 19.

As will be mentioned below, during reception of data broadcast, a change in given information included in the data content of the data broadcast and in the related information is detected. The given information here is any one or more of the above information used for the creation of the control information.

When a change in the given information is detected, and it is the update timing at each certain interval, the control information creator 18*e* creates control information for storage to the first storage 19. In normal reproduction of the data content stored in the first storage 19, the data content and the control information of the data broadcast being reproduced are stored into the second storage 20. In other words, the data content and the control information stored in the second storage 20 vary depending on the data broadcast being reproduced.

During special reproduction of the data content stored in the first storage 19 or after the special reproduction, the control information stored in the second storage 20 is compared with the control information read out from the first storage 19 during the special reproduction or after the special reproduction is stopped. When the control information stored in the second storage 20 and the control information read out from the first storage 19 coincide with each other, the data broadcast continues to be reproduced, using the data content stored in the second storage 20. When the control information stored in the second storage 20 and the control information read out from the first storage 19 do not coincide with each other, the data content and control information stored in the second storage 20 are discarded, with the result that the data broadcast is rebooted based on the data content stored in the first storage 19.

The control information is separated from a stream for storage into the first storage 19. In this case, it is not necessary to perform seek process for the control information during special reproduction, which allows the data broadcast to be continuously reproduced even during the special reproduction. When the control information is separated from the stream to be stored in the first storage, synchronization with respect to the reproduction of the data content involves the use of the control information along with the time information stored in the first storage 19. The stored locations (recorded locations) of the control information and the timing information in the first storage 19 are stored as recording information in the first storage 19.

Figure 4:
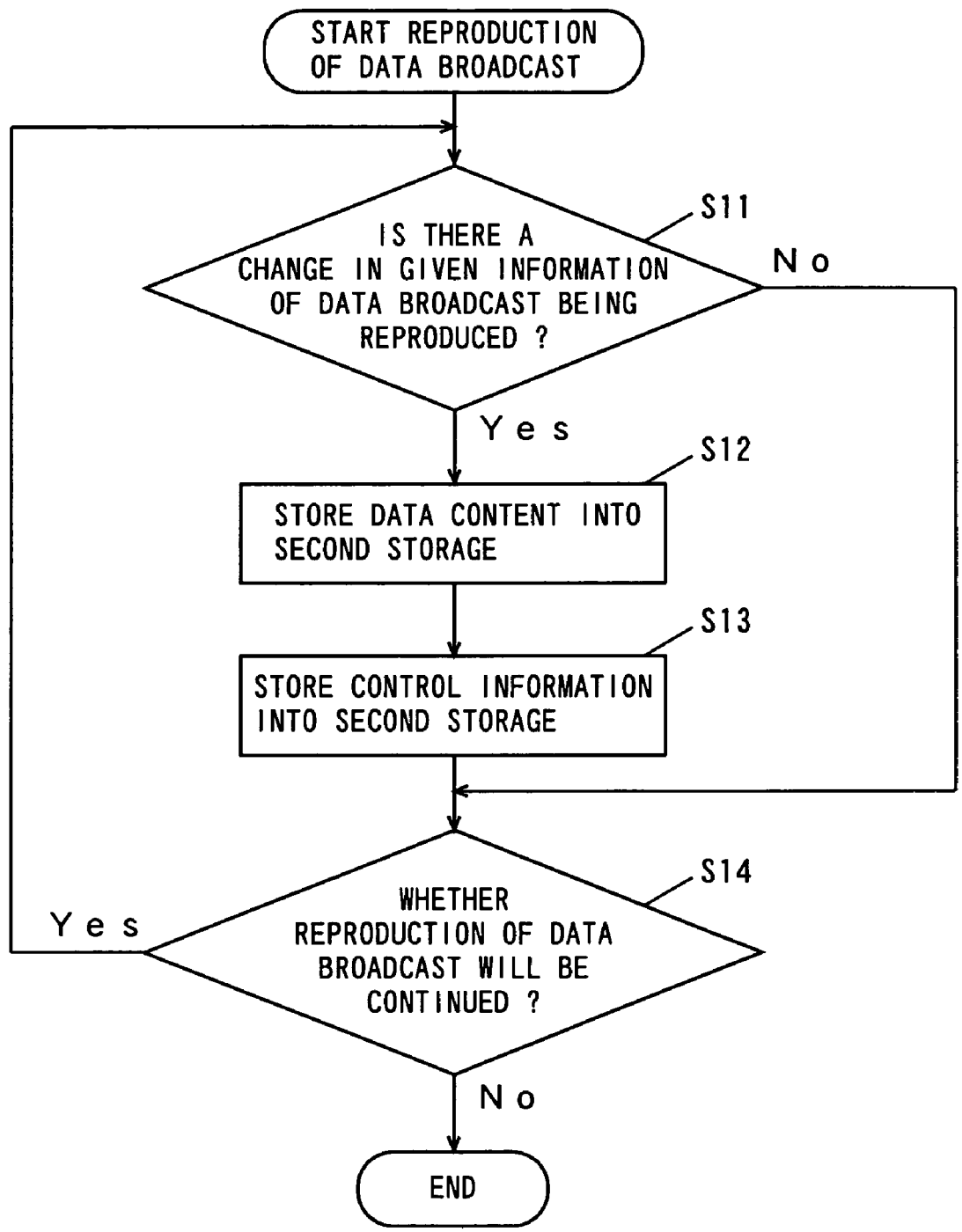
FIG. 4 is a flowchart showing processes by the input/output information controller during normal reproduction of data broadcast.
Figure 5:
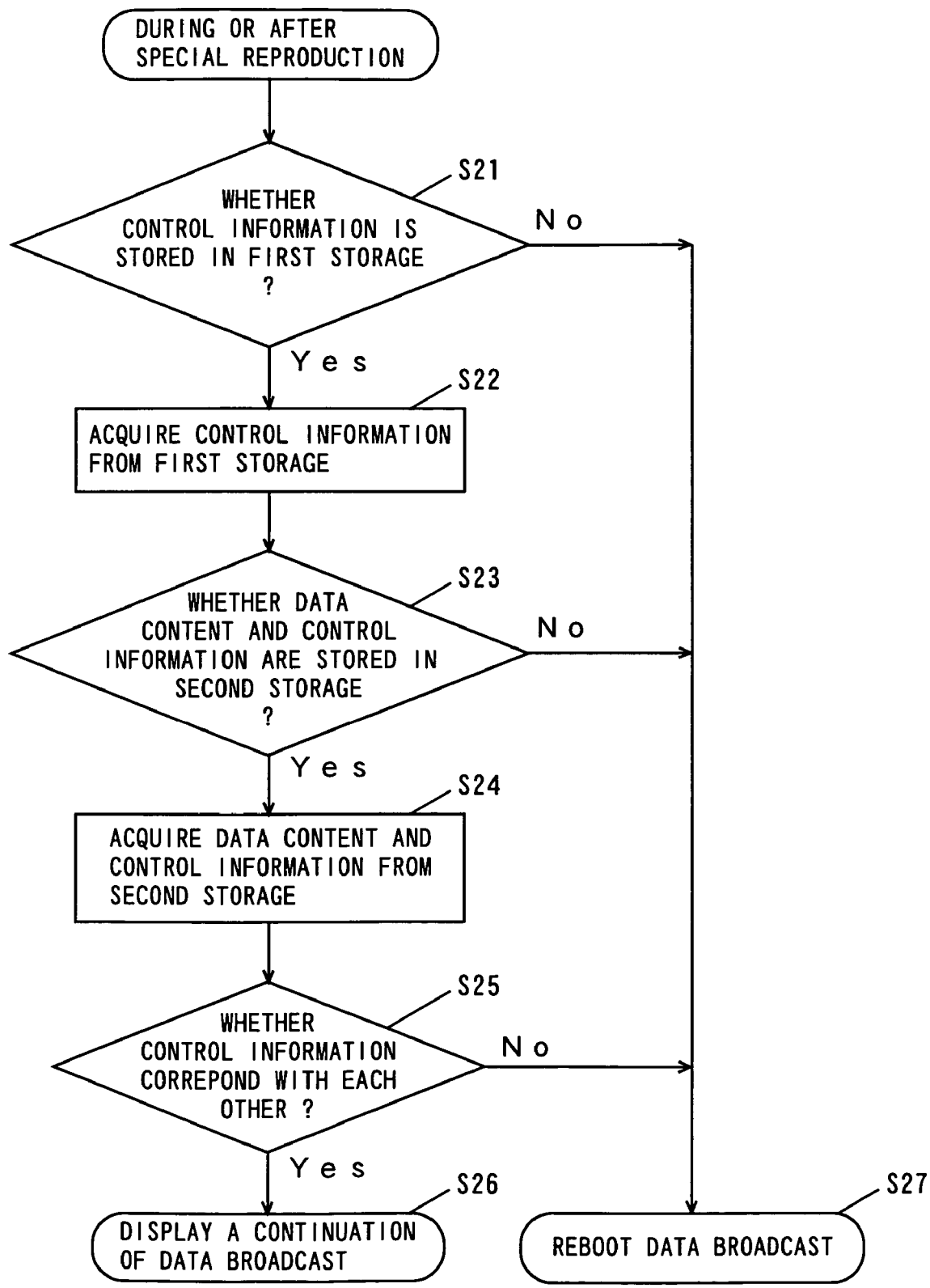
FIG. 5 is a flowchart showing processes by the input/output controller during special reproduction and after the special reproduction is stopped.

Description will hereinafter be given of processes by the input/output information controller with reference to FIGS. 3 to 5. The processes of FIGS. 3 to 5 are performed under the control of the CPU 18*a* in accordance with the data broadcast reproduction control program stored in the program ROM 18*b*.

Figure 3:
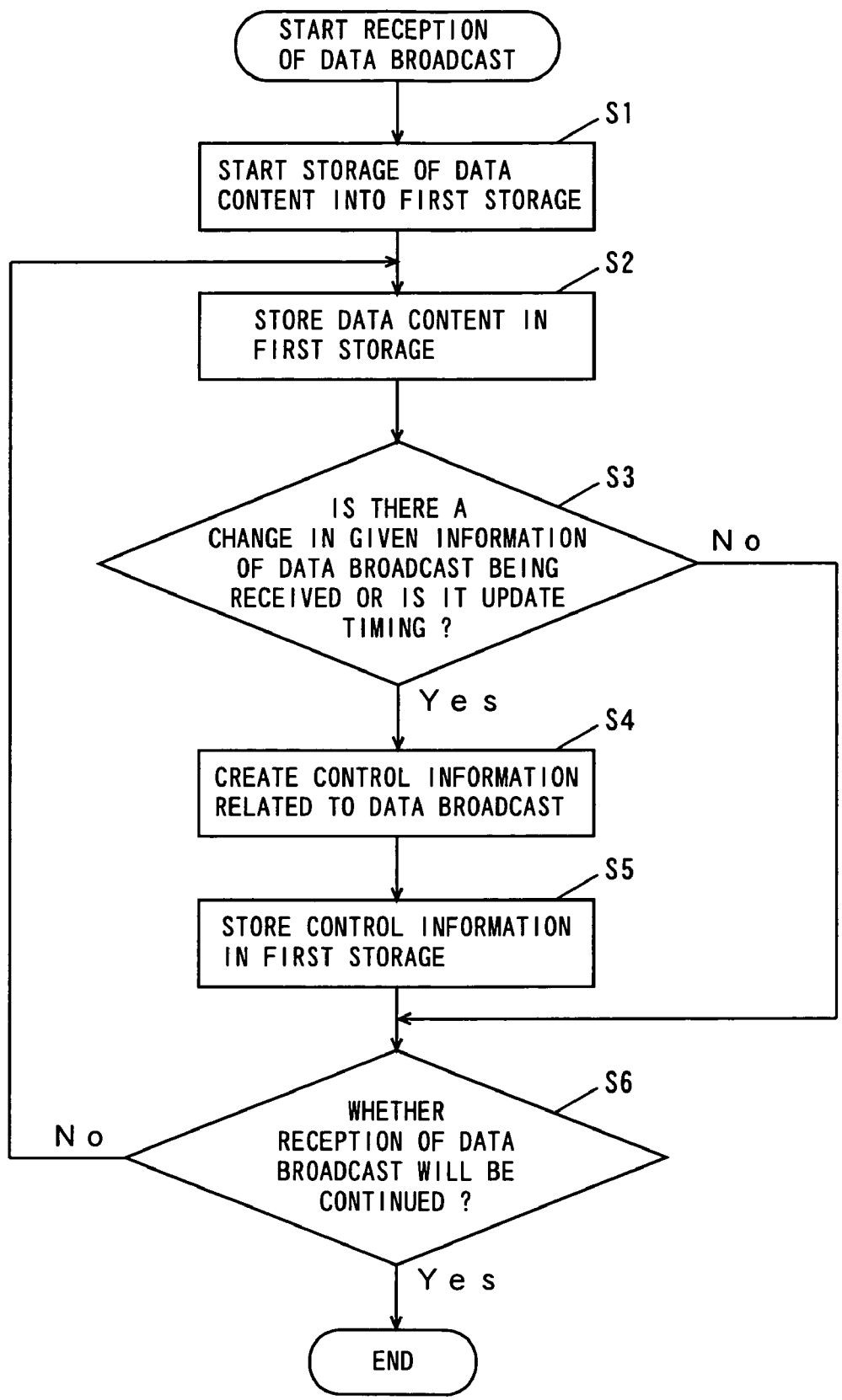
FIG. 3 is a flowchart showing processes by the input/output information controller during reception of data broadcast.

FIG. 3 is a flowchart showing the processes by the input/output information controller 18 during reception of data broadcast.

When reception of data broadcast is started, the data content are supplied from the information input/output circuit 18*d* to the storage controller 18*f* via the system bus 18*i*. The storage controller 18*f* starts storage of the data content into the first storage 19 (Step S1) to store the data content in the first storage 19 (Step S2).

The comparison determiner 18*g* determines whether or not a change is detected in given information of the data broadcast being received, while determining, based on the time information created by the clock unit 18*h*, whether or not the current time is the update timing at each certain interval (Step S3).

When a change is detected in given information of the data broadcast being received or when the current time is the update timing, the control information creator 18*e* creates control information related to the data broadcast being received (Step S4).

Further, the storage controller 18*f* stores the control information created by the control information creator 18*e* in the first storage 19 (Step S5).

After this, the CPU 18*a* determines whether or not reception of the data broadcast will be continued (Step S6). When reception of the data broadcast will be continued, the CPU 18*a* returns to Step S2 to repeat the processes at Steps S2 to S6. When reception of the data broadcast will not be continued, the CPU 18*a* ends the processes.

In this manner, during reception of the data broadcast, the control information related to the data broadcast, along with the data content, are stored in the first storage 19 at each certain interval and with each change in given information of the data broadcast.

FIG. 4 is a flowchart showing the processes by the input/output information controller 18 in normal reproduction of data broadcast.

When normal reproduction of data broadcast is started, the storage controller 18*f* reads out the data content stored in the first storage along with the control information. In this case, the comparison determiner 18*g* determines whether or not a change is detected in given information of the data broadcast being reproduced (Step S11).

When a change is detected in given information of the data broadcast being reproduced, the storage controller 18*f* stores the data content of the data broadcast being reproduced into the second storage 20 (Step S12).

In addition, the storage controller 18f stores the control information related to the data broadcast being reproduced into the second storage 20 (Step S13).

After this, the CPU 18a determines whether or not the reproduction of the data broadcast will be continued (Step S14). When the reproduction of the data broadcast will be continued, the CPU 18a returns to Step 11 to repeat the processes at Steps S11 to S14. When the reproduction of the data broadcast will not be continued, the CPU 18a ends the processes.

In this manner, during the reproduction of the data broadcast, at the time of a change detected in given information of the data broadcast, the data content and the control information of the data broadcast being reproduced are temporarily stored in the second storage 20.

FIG. 5 is a flowchart showing the processes by the input/output information controller 18 during and after special reproduction of data broadcast.

Note that the special reproduction here means reproduction at a different speed from that of the normal reproduction, including fast-forwarding/rewinding of the data content.

During or after the reproduction of data broadcast, the storage controller 18f determines whether or not the control information related to the data broadcast to be reproduced is stored in the first storage 19 (Step S21). When the control information is stored in the first storage 19, the storage controller 18f acquires the control information from the first storage 19 for storage at a first location in the work RAM 18c (Step S22).

In addition, the storage controller 18f determines whether or not the data content and the control information are stored in the second storage 20 (Step S23). When the data content and the control information are stored in the second storage 19, the storage controller 18f acquires the data content and the control information from the second storage 20 for storage at a second storage location in the work RAM18c (Step S24).

Further, the comparison determiner 18g determines whether or not the control information stored at the first storage location in the work RAM18c coincides with the control information stored at the second storage location (Step S25).

When these pieces of control information coincide with each other, the CPU 18a continues with the reproduction of the data broadcast, using the data content acquired from the second storage 20, to display a continuation of the data broadcast on the monitor 30 (Step S26).

When these pieces of control information do not coincide with each other, the CPU 18a reboots the data broadcast (Step S27).

The data broadcast is rebooted also when, at Step S21, the control information to be reproduced related to the data broadcast is not stored in the first storage 19, and when, at Step S23, the data content and the control information are not stored in the second storage 19.

In this manner, during reception of data broadcast, the data content and the control information are stored in the first storage 19, and the data content and the control information are stored in the second storage 20 during normal reproduction of the data broadcast, so that the data broadcast can be quickly reproduced using the data content stored in the second storage 20 without rebooting the data broadcast during and after special reproduction. This allows a user to continuously view, during and after special reproduction, the data broadcast he or she has been viewing before the special reproduction. Hence, a data broadcast service of a higher degree of usability is provided.

(2) Second Embodiment

The structures of a data broadcast reproduction controller according to a second embodiment and a digital broadcast receiver that includes the same, and the structure of the input/output information controller are similar to the structures shown in FIGS. 1 and 2.

In this embodiment, during reception of data broadcast, the data content is stored in the first storage 19. In normal reproduction of the data content stored in the first storage 19, a change in given information of the data broadcast is detected. When a change in given information is detected, control information is created by the control information creator 18e, and the data content and control information of the data broadcast being reproduced are stored in the second storage 20. The control information is similar to that in the first embodiment.

During or after special reproduction of the data content stored in the first storage 19, the control information stored in the second storage 20 is compared with the control information read out from the first storage 19 during or after the special reproduction. When the control information stored in the second storage 20 and the control information read out from the first storage 19 coincide with each other, the data broadcast continues to be reproduced using the data content stored in the second storage 20. When the control information stored in the second storage 20 and the control information read out from the first storage 19 do not coincide with each other, the data content and the control information stored in the second storage 20 are discarded, with the result that the data broadcast is rebooted based on the data content stored in the first storage 19.

Figure 6:
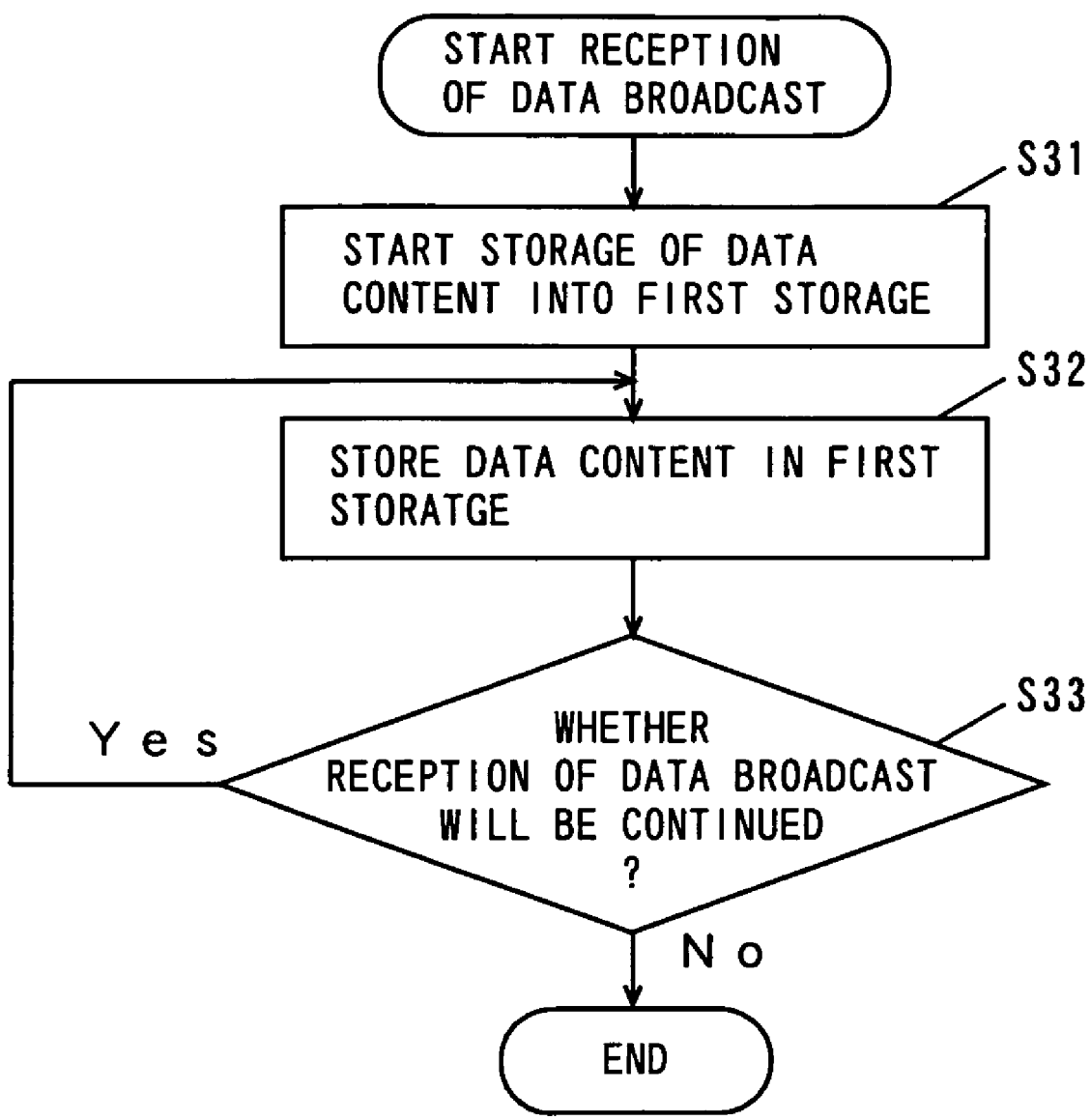
FIG. 6 is a flowchart showing processes by the input/output information controller during reception of data broadcast.
Figure 7:
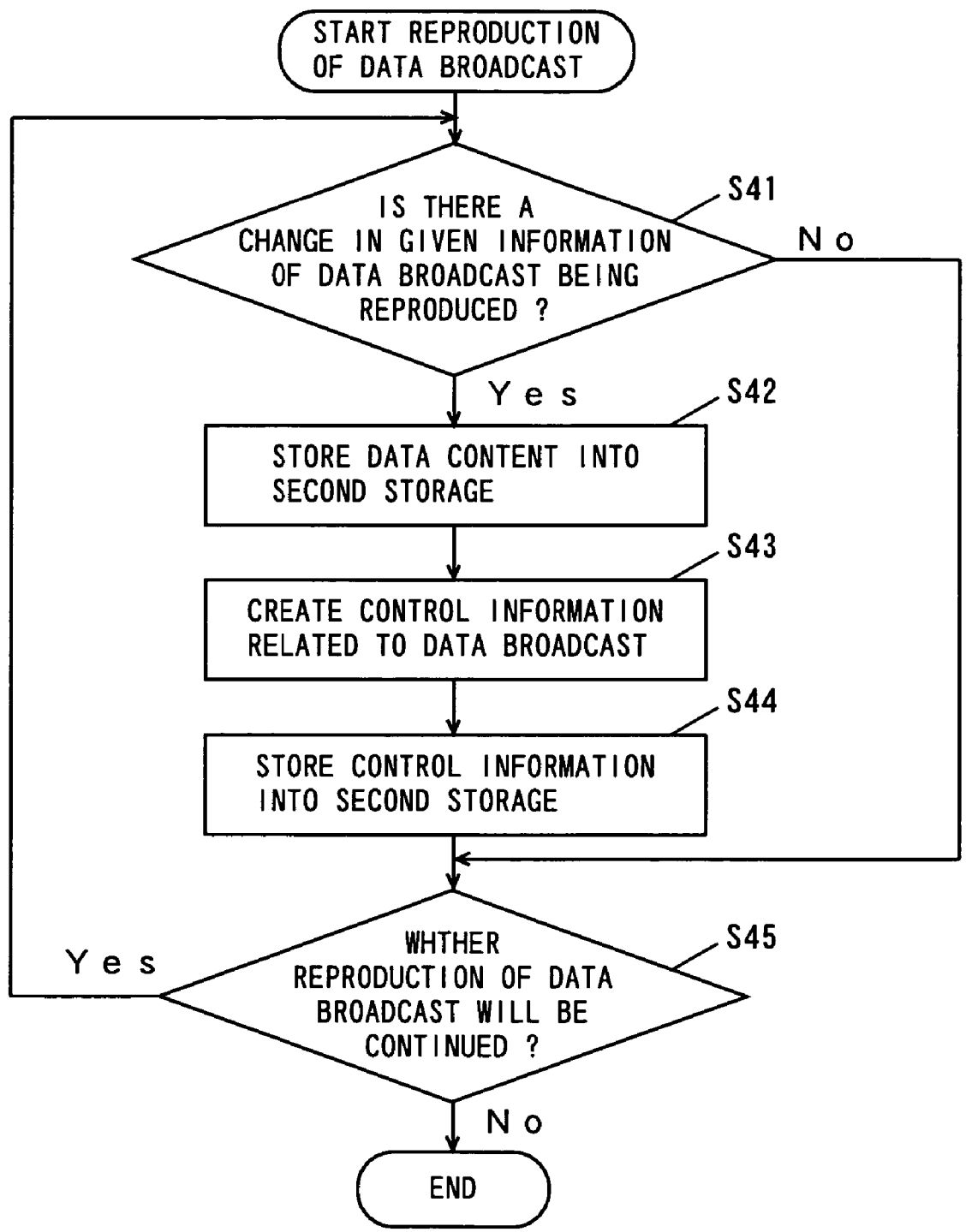
FIG. 7 is a flowchart showing the processes by the input/output information controller during normal reproduction.
Figure 8:
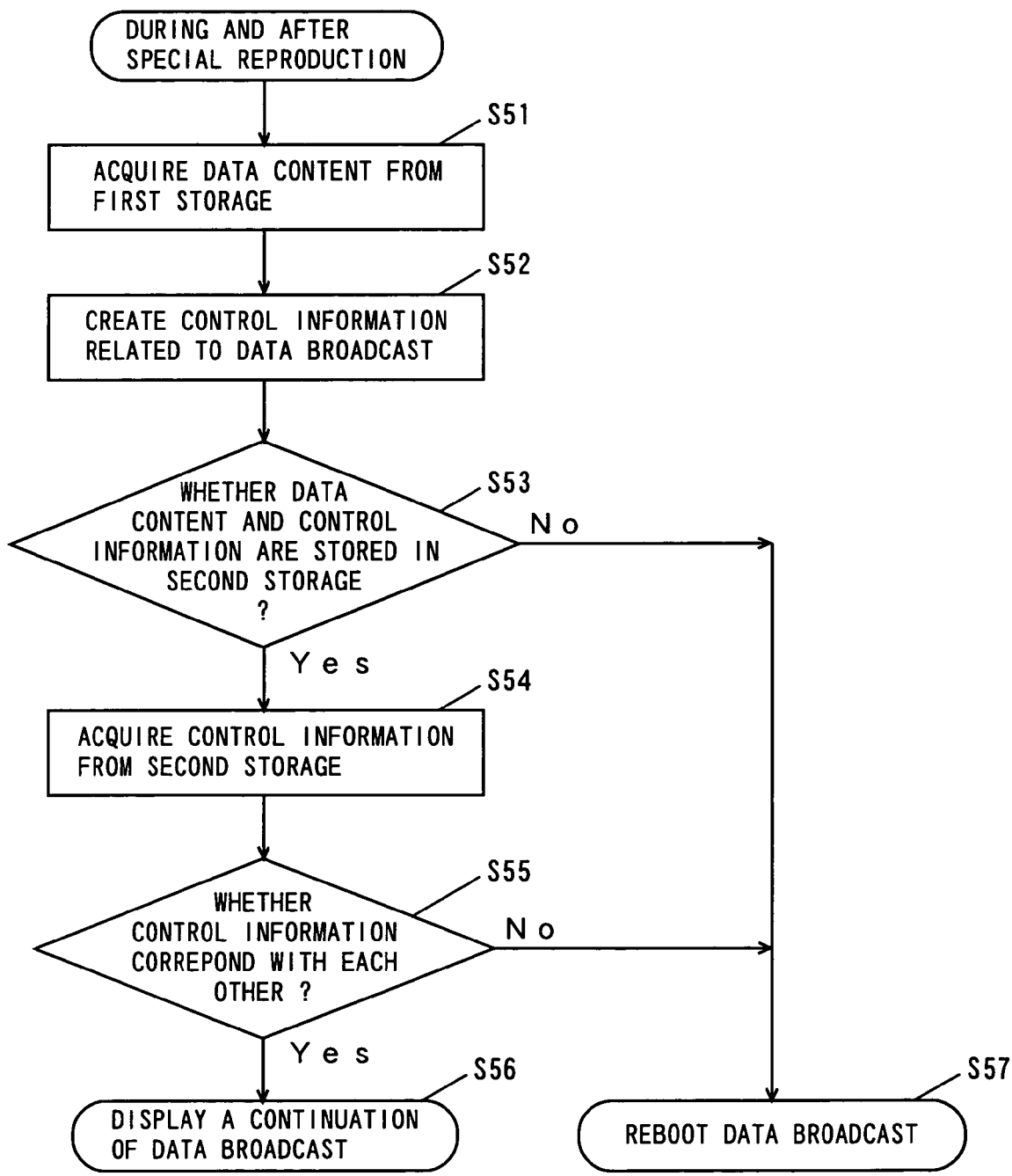
FIG. 8 is a flowchart showing the processes by the input/output information controller during special reproduction and after the special reproduction is stopped.

Referring now to FIGS. 6 to 8, processes by the input/output information controller 18 will be described. The processes of FIGS. 6 to 8 are performed under the control of the CPU 18a in accordance with the data broadcast reproduction program stored in the work RAM 18c.

FIG. 6 is a flowchart showing the processes by the input/output information controller 18 during reception of data broadcast.

When reception of data broadcast is started, the data content is supplied via the information input/output circuit 18d to the storage controller 18f. The storage controller 18f starts storage of the data content into the first storage 19 (Step S31) to store the data content in the first storage 19 (Step S32).

After this, the CPU 18a determines whether or not reception of the data broadcast will be continued (Step S33). When reception of the data broadcast will be continued, the CPU 18a returns to Step S32 to repeat the processes at Steps S32 to S33. When reception of the data broadcast will not be continued, the CPU 18a ends the processes.

In this manner, during reception of the data broadcast, the data content is stored in the first storage 19.

FIG. 7 is a flowchart showing the processes by the input/output information controller 18 in normal reproduction of data broadcast.

When normal reproduction of data broadcast is started, the storage controller 18f reads out the data content stored in the first storage 19. The comparison determiner 18g determines whether or not a change in given information of the data broadcast being reproduced is detected (Step S41).

When a change in given information of the data broadcast being reproduced is detected, the data content of the data broadcast being reproduced is stored in the second storage 20 (Step S42).

Also, the control information creator 18e creates control information related to the data broadcast being reproduced (Step S43).

In addition, the storage controller 18f stores the control information created by the control information creator 18e in the second storage 20 (Step S44).

After this, the CPU 18a determines whether or not the reproduction of the data broadcast will be continued (Step S45). When the reproduction of the data broadcast will be continued, the CPU 18a returns to Step S42 to repeat the processes at Steps S41 to S45. When the reproduction of the data broadcast will not be continued, the CPU 18a ends the processes.

In this manner, during the reproduction of the data broadcast, the data content and control information of the data broadcast being reproduced are, when a change is detected in given information, temporarily stored in the second storage 20.

FIG. 8 is a flowchart showing the processes by the input/output information controller 18 during and after special reproduction of data broadcast.

During or after special reproduction of data broadcast, the storage controller 18f acquires the data content of the data broadcast to be reproduced from the first storage 19 (Step S51). Also, the control information creator 18e creates control information related to the data broadcast based on the data content acquired from the first storage 19, for storage at a first storage location in the work RAM 18c (Step S52).

In addition, the storage controller 18f determines whether or not the data content and the control information are stored in the second storage 20 (Step S53). When the data content and the control information are stored in the second storage 20, the storage controller 18f acquires the control information from the second storage 20 for storage at a second location in the work RAM 18c (Step S54).

Moreover, the comparison determiner 18g determines whether or not the control information stored at the first storage location in the work RAM 18c and the control information stored at the second storage location coincide with each other (Step S55).

When these pieces of control information coincide with each other, the CPU 18a continues the reproduction of the data broadcast using the data content acquired from the second storage 20 to display a continuation of the data broadcast on the monitor 30 (Step S56).

When these pieces of control information do not coincide with each other, the CPU 18a reboots the data broadcast (Step S57).

The data broadcast is rebooted also when, at Step S53, the data content and the control information of the data broadcast are not stored in the second storage 20.

In this manner, in normal operation of the data broadcast, the data content and the control information are stored in the second storage 20, so that the data broadcast can be quickly reproduced using the data content stored in the second storage 20 without rebooting the data broadcast during special reproduction and after the special reproduction is stopped. This allows a user to continuously view, during and after special reproduction, the data broadcast he or she has been viewing before the special reproduction. Hence, a data broadcast service of a higher degree of usability is provided.

(3) Third Embodiment

The structures of a data broadcast reproduction controller according to a third embodiment and a digital broadcast receiver that includes the same, and the structure of the input/output information controller are similar to the structures shown in FIGS. 1 and 2. The control information is similar to that in the first embodiment.

In this embodiment, during reception of the data content of data broadcast, a change in given information of the data broadcast is detected. When a change is detected in given information, control information is created by the control information creator 18e, so that the data content and the control information are stored in the second storage 20.

When the receiving channel of the data broadcast is changed, control information is created based on the data content being received and related information. The control information stored in the second storage 20 is compared with the created control information. When the control information stored in the second storage 20 and the created control information coincide with each other, the data broadcast continues to be reproduced using the data content stored in the second storage 20. When the control information stored in the second storage 20 and the created control information do not coincide with each other, the data content and the control information stored in the second storage are discarded, and the data content of the data broadcast is reacquired.

Figure 9:
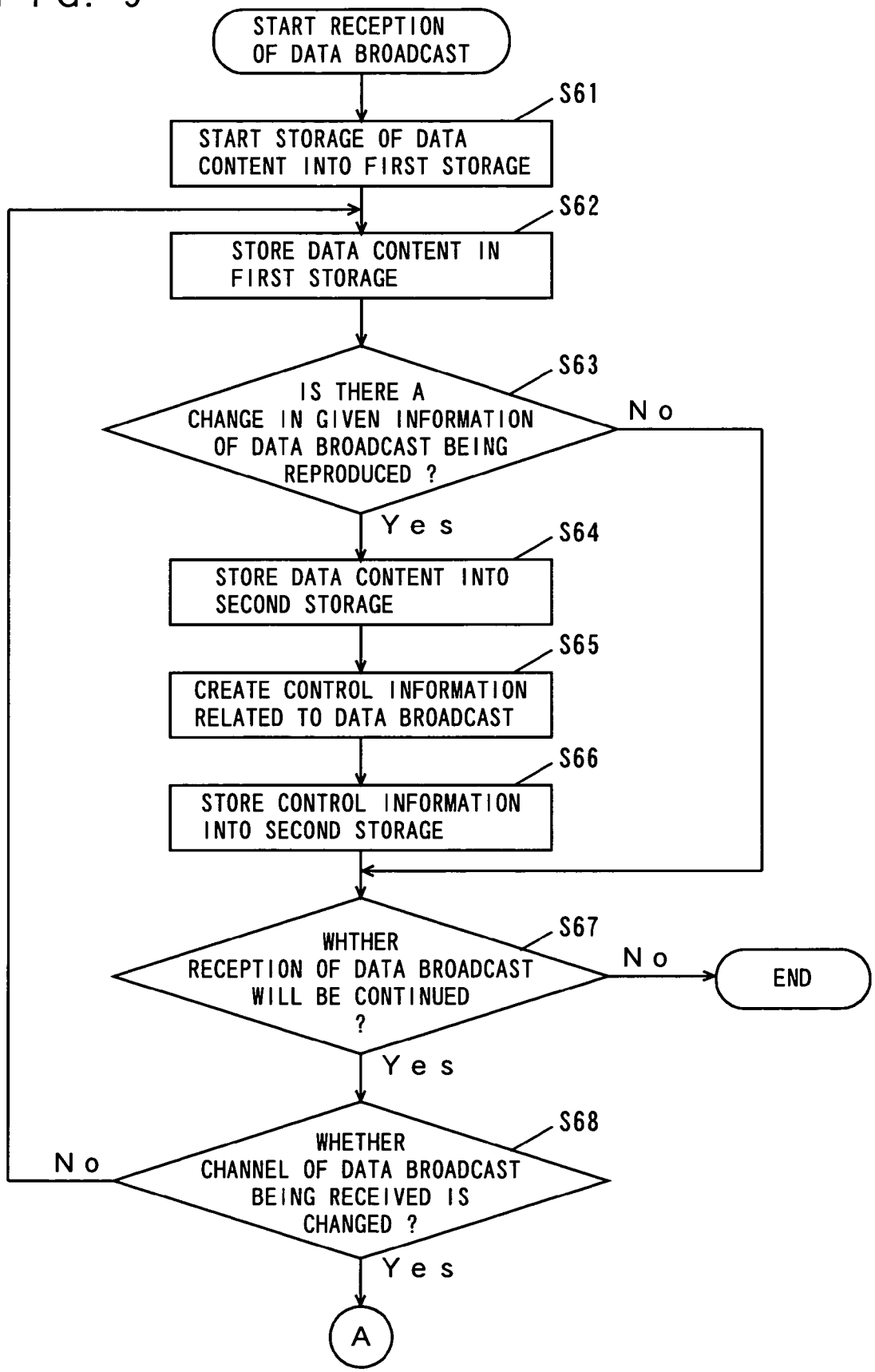
FIG. 9 is a flowchart showing processes by the input/output information controller during reception of data broadcast.
Figure 10:
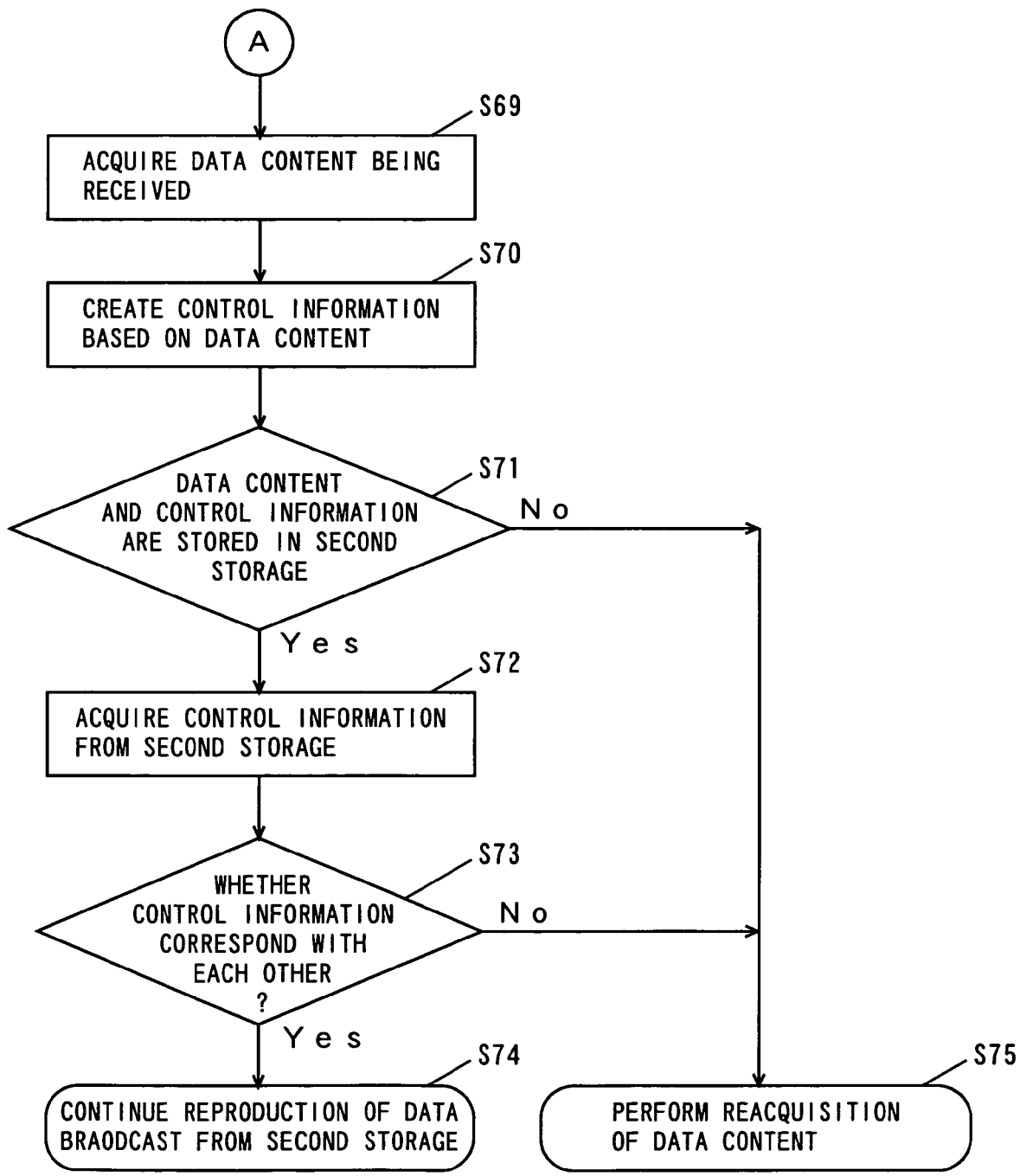
FIG. 10 is a flowchart showing processes by the input/output information controller during reception of data broadcast.

Referring now to FIGS. 9 and 10, the processes by the input/output information controller 18 will be described. The processes of FIGS. 9 and 10 are performed under the control of the CPU 18a in accordance with the reproduction control program stored in the program ROM 18b.

FIGS. 9 and 10 are flowcharts showing the processes by the input/output information controller 18 during reception of data broadcast.

When reception of data broadcast is started, the data content is supplied from the information input/output circuit 18d via the system bus 18i to the storage controller 18f. The control information creator 18e starts storage of the data content into the first storage 19 (Step S61) to store the data content in the first storage 19 (Step S62).

The comparison determiner 18g determines whether or not a change in given information of the data broadcast being received is detected (Step S63).

When a change in given information of the data broadcast being received is detected, the storage controller 18f stores the data content of the data broadcast being received into the second storage 20 (Step S64).

Also, the control information creator 18e creates control information related to the data broadcast being received (Step S65).

In addition, the storage controller 18f stores the control information created by the control information creator 18e into the second storage 20 (Step S66).

After this, the CPU 18a determines whether or not reception of the data broadcast will be continued (Step S67). When reception of the data broadcast will be continued, the CPU 18a determines whether or not the channel of the data broadcast being received is changed (Step S68).

When the channel of the data broadcast being received is changed, the CPU 18a acquires the data content of the data broadcast being received for storage at a first storage location in the work RAM 18c (Step S69). The control information creator 18e creates control information based on the acquired data content and the related information (Step S70).

The storage controller 18f determines whether or not the data content and the control information are stored in the second storage 20 (Step S71).

When the data content and the control information are stored in the second storage 20, the storage controller 18f acquires the control information from the second storage 20 for storage at a second location in the work RAM 18c (Step S72).

In addition, the comparison determiner 18g determines whether or not the control information stored at the first storage location in the work RAM 18c and the control information stored at the second storage location coincide with each other (Step S73).

When these pieces of control information coincide with each other, the CPU 18a continues the reproduction of the data broadcast using the data content stored in the second storage 20 (Step S74), and returns to Step S62.

When these pieces of control information do not coincide with each other, the CPU 18a performs reacquisition of the data content of the data broadcast (Step S75), and returns to Step S62.

In this manner, during reception of the data broadcast, the data content and the control information are stored in the second storage 20, so that when the channel of the data broadcast is changed, it is possible to quickly reproduce the data broadcast that has been previously received, using the data content stored in the second storage 20 without reacquisition of the data content of the data broadcast. This allows a user, when he or she has switched a channel, to continuously view the data broadcast that he or she has been previously viewing. Hence, a data broadcast service of a higher degree of usability is provided.

(4) Other Modifications

The method of forming the control information is not limited to those described above: the formation of the control information may also be accomplished using other information of the program information and other data values described in the data script, with the result of a similar effect.

Alternatively, single or a plurality of control information may be created for the data broadcast being reproduced. For example, by creating control information for each data ES (Elementary Stream) and comparing control information for each data ES, the reproduction control for each data ES can be accomplished.

In the above-described first embodiment, when a change in given information is detected during the reproduction of the data broadcast, the data content and the control information of the data broadcast are stored in the second storage 20; however, the data content and the control information of the data broadcast may be stored in advance during the reproduction of the data broadcast.

In addition, in each of the above first embodiment to third embodiment, the first storage 19 is composed of a hard disc, and the second storage 20 is composed of a RAM; however, the first storage 19 and the second storage 20 may each be composed of any of various kinds of recording mediums including a non-volatile memory such as a flash ROM or EEPROM (Electrically Erasable and Programmable Read Only Memory) or an optical recording medium such as a DVD (Digital Video Disc), with the result of a similar effect to that obtained in each of the above embodiments.

Moreover, in each of the above first embodiment to third embodiment, the data broadcast reproduction control program for controlling the input/output information controller 18 is stored in the program ROM 18b as a recording medium; however, the data broadcast reproduction control program may be recorded in other kind of recording medium, such as a floppy disc, a CD (Compact Disc)-ROM, DVD, or a memory card. In this case, the CPU 18a reads the data broadcast reproduction control program from the recording medium for execution.

With the data broadcast reproduction control program being recorded in such a recording medium, transfer of the data broadcast reproduction control program is enabled, so that the reproduction control as in the above embodiments may be performed even on other independent apparatus such as a personal computer.

Furthermore, each of the components in the data broadcast reproduction controller 100 may be composed of hardware such as an electronic circuit, or an information processor such as a CPU with software.

In each of the above embodiments, the tuner 10, digital demodulator 11, demultiplexer 13, information decoder 14, related information processor 15, and information synthesizer 16 correspond to a receiver. The information output unit 17 corresponds to a reproducer; the first storage 19 corresponds to a first storage; the second storage 20 corresponds to a second storage; the control information creator 18e corresponds to a control information creator; the comparison determiner 18g corresponds to a determiner; and the CPU and the storage controller 18f correspond to a controller.

The invention claimed is:

1. A data broadcast reproduction controller for controlling the reproduction of data broadcast including one or more data contents, comprising:
    a receiver that receives data content of data broadcast and related information attached to said data broadcast;
    a first storage that stores the data content of the data broadcast received by said receiver;
    a reproducer that reproduces the data content of the data broadcast stored in said first storage;
    a control information creator that creates control information for identifying the data content of the data broadcast based on given information included in the data content of the data broadcast received by said receiver or reproduced by said reproducer, and/or the related information;
    a second storage that stores, during first reproduction by said reproducer, the data content of the data broadcast acquired from said first storage and control information corresponding to the data content;
    a determiner that determines, during a second reproduction by said reproducer, whether or not the control information stored in said second storage and the control information corresponding to the data content of data broadcast to be reproduced coincide with each other; and
    a controller that controls said reproducer to reproduce the data broadcast, using the data content stored in said second storage, when said determiner determines that the control information stored in said second storage and the control information corresponding to said data content of the data broadcast to be reproduced coincide with each other, and that controls said reproducer to reboot the data broadcast, using the data content stored in said first storage when said determiner determines that the control information stored in said second storage and the control information corresponding to said data content of the data broadcast to be reproduced do not coincide with each other.

2. The data broadcast reproduction controller according to claim 1, wherein said control information creator creates control information based on given information included in the data content of the data broadcast received by said receiver, and/or the related information, to store said created control information to said first storage.

3. The data broadcast reproduction controller according to claim 2, wherein
said control information creator creates control information at the time of a change in at least some of the information of the data broadcast received by said receiver or at given update timing.

4. The data broadcast reproduction controller according to claim 2, wherein
said control information creator stores, during said first reproduction by said reproducer, the data content of the data broadcast acquired from said first storage and the control information corresponding to the data content into said second storage.

5. The data broadcast reproduction controller according to claim 4, wherein
said control information creator stores, at the time of a change in at least some of the information of the data broadcast reproduced during said first reproduction by said reproducer, the data content of the data broadcast acquired from said first storage and the control information corresponding to the data content into said second storage.

6. The data broadcast reproduction controller according to claim 4, wherein
said determiner determines, during said second reproduction by said reproducer, whether or not the control information stored in said second storage and the control information stored in said first storage coincide with each other.

7. The data broadcast reproduction controller according to claim 5, wherein
said determiner determines, during said second reproduction by said reproducer, whether or not the control information stored in said second storage and the control information stored in said first storage coincide with each other.

8. The data broadcast reproduction controller according to claim 1, wherein said control information creator creates, during said first reproduction by said reproducer, control information based on given information included in the data content of the data broadcast acquired from said first storages, and/or the related information, to store the created control information into said second storage.

9. The data broadcast reproduction controller according to claim 8, wherein
said control information creator stores, at the time of a change in at least some of the information of the data broadcast reproduced during said first reproduction by said reproducer, the data content of the data broadcast acquired from said first storage and the control information corresponding to the data content into said second storage.

10. The data broadcast reproduction controller according to claim 8, wherein
said control information creator creates, during said second reproduction by said reproducer, control information based on given information included in the data content of the data broadcast acquired from said first storage and/or the related information, and
said determiner determines, during said second reproduction by said reproducer, whether or not the control information stored in said second storage and the control information created by said control information creator coincide with each other.

11. The data broadcast reproduction controller according to claim 1, wherein
said second reproduction includes reproduction at a different speed from that of said first reproduction.

12. The data broadcast reproduction controller according to claim 1, wherein said given information included in the data content of data broadcast, and/or the related information includes content-reference information described in a data script.

13. A data broadcast reproduction controller for controlling the reproduction of data broadcast including one or more data contents, comprising:
a receiver that receives data content of data broadcast and related information attached to said data broadcast;
a first storage that stores the data content of the data broadcast received by said receiver;
a reproducer that reproducers the data content of the data broadcast received by said receiver;
a control information creator that creates control information for identifying the data content of the data broadcast based on given information included in the data content of the data broadcast received by said receiver, and/or the related information;
a second storage that stores, during first reception by said receiver, the data content of the data broadcast acquired from said first storage and the control information corresponding to the data content;
a determiner that determines, during second reception by said receiver, whether or not the control information stored in said second storage and the control information corresponding to the data content of the data broadcast received by said receiver coincide with each other; and
a controller that controls said reproducer to reproduce data broadcast, using the data content stored in said second storage, when said determiner determines that the control information stored in said second storage and the control information corresponding to the data content of the data broadcast received by said receiver coincide with each other, and that controls said reproducer to reboot the data broadcast, using the data content stored in said first storage when said determiner determines that the control information stored in said second storage and the control information corresponding to said data content of the data broadcast to be reproduced does not coincide with each other.

14. The data broadcast reproduction controller according to claim 13, wherein
said control information creator creates control information at the time of a change in at least some of the information of the data broadcast received by said receiver during said first reception by said receiver.

15. The data broadcast reproduction controller according to claim 13, wherein
said first reception takes place before a receiving channel is changed, and said second reception takes place after the receiving channel is changed.

16. The data broadcast reproduction controller according to claim 13, wherein said given information included in the data content of data broadcasts, and/or the related information includes content-reference information described in a data script.

17. A method for controlling the reproduction of data broadcast including one or more data contents, comprising:
receiving data content of data broadcast and related information attached to said data broadcast;
storing the data content of said received data broadcast into a first storage;

reproducing the data content of the data broadcast stored in said first storage;

creating control information for identifying the data content of the data broadcast based on given information included in the data content of said received or reproduced data broadcast and/or the related information;

storing, during first reproduction, the data content of the data broadcast acquired from said first storage and the control information corresponding to the data content into a second storage;

determining, during second reproduction, whether or not the control information stored in said second storage and the control information corresponding to the data content of data broadcast to be reproduced coincide with each other; and controlling the reproduction such that the data broadcast is reproduced, using the data content stored in said second storage, when it is determined that the control information stored in said second storage and the control information corresponding to the data content of said data broadcast to be reproduced coincide with each other, and controlling the reproduction such that the data broadcast is rebooted, using the data content stored in said first storage when it is determined that the control information stored in said second storage and the control information corresponding to said data content of the data broadcast to be reproduced does not coincide with each other.

18. A method for controlling the reproduction of data broadcast including one or more data contents, comprising:

receiving data content of data broadcast and related information attached to said data broadcast;

storing the data content of said received data broadcast into a first storage;

reproducing the data content of said received data broadcast;

creating control information for identifying the data content of the data broadcast based on given information included in the data content of said received data broadcast and/or the related information;

storing, during first reception, the data content of the data broadcast acquired from said first storage and the control information corresponding to the data content into a second storage;

determining, during second reception, whether or not the control information stored in said second storage and the control information corresponding to the data content of said received data broadcast coincide with each other; and controlling the reproduction such that the data broadcast is reproduced, using the data content stored in said second storage, when it is determined that the control information stored in said second storage and the control information corresponding to the data content of said received data broadcast coincide with each other, and controlling the reproduction such that the data broadcast is rebooted, using the data content stored in said first storage when it is determined that the control information stored in said second storage and the control information corresponding to said data content of the data broadcast to be reproduced does not coincide with each other.

19. A data broadcast reproduction control program which is executable by a computer and controls the reproduction of data broadcast including one or more data contents, said data broadcast reproduction control program allowing said computer to execute the processes of:

receiving data content of data broadcast and related information attached to said data broadcast;

storing the data content of said received data broadcast into a first storage;

reproducing the data content of the data broadcast stored in said first storage;

creating control information for identifying the data content of the data broadcast based on given information included in the data content of said received or reproduced data broadcast, and/or the related information;

storing, during first reproduction, the data content of the data broadcast acquired from said first storage and the control information corresponding to the data content into a second storage;

determining, during second reproduction, whether or not the control information stored in said second storage and the control information corresponding to the data content of data broadcast to be reproduced coincide with each other; and controlling the reproduction such that the data broadcast is reproduced, using the data content stored in said second storage, when it is determined that the control information stored in said second storage and the control information corresponding to the data content of said data broadcast to be reproduced coincide with each other, and controlling the reproduction such that the data broadcast is rebooted, using the data content stored in said first storage when it is determined that the control information stored in said second storage and the control information corresponding to said data content of the data broadcast to be reproduced does not coincide with each other.

20. A data broadcast reproduction control program which is executable by a computer and controls the reproduction of data broadcast including one or more data contents, said data broadcast reproduction control program allowing said computer to execute the processes of:

receiving data content of data broadcast and related information attached to said data broadcast;

storing the data content of said received data broadcast into a first storage;

reproducing the data content of said received data broadcast;

creating control information for identifying the data content of the data broadcast based on given information included in the data content of said received data broadcast, and/or the related information;

storing, during first reception, the data content of the data broadcast acquired from said first storage and the control information corresponding to the data content into a second storage;

determining, during second reception, whether or not the control information stored in said second storage and the control information corresponding to the data content of said received data broadcast coincide with each other; and controlling the reproduction such that the data broadcast is reproduced, using the data content stored in said second storage, when it is determined that the control information stored in said second storage and the control information corresponding to the data content of said received data broadcast coincide with each other, and controlling the reproduction such that the data broadcast is rebooted, using the data content stored in said first storage when it is determined that the control information stored in said second storage and the control information corresponding to said data content of the data broadcast to be reproduced does not coincide with each other.

21. A computer-readable recording medium in which a data broadcast reproduction control program for controlling the reproduction of data broadcast including one or more data contents is recorded, said data broadcast reproduction control program allowing said computer to execute the processes of:

receiving data content of data broadcast and related information attached to said data broadcast;

storing the data content of said received data broadcast into a first storage;

reproducing the data content of the data broadcast stored in said first storage;

creating control information for identifying the data content of the data broadcast based on given information included in the data content of said received or reproduced data broadcast and/or the related information;

storing, during first reproduction, the data content of the data broadcast acquired from said first storage and the control information corresponding to the data content into a second storage;

determining, during second reproduction, whether or not the control information stored in said second storage and the control information corresponding to the data content of data broadcast to be reproduced coincide with each other; and controlling the reproduction such that the data broadcast is reproduced, using the data content stored in said second storage, when it is determined that the control information stored in said second storage and the control information corresponding to the data content of said data broadcast to be reproduced coincide with each other, and controlling the reproduction such that the data broadcast is rebooted, using the data content stored in said first storage when it is determined that the control information stored in said second storage and the control information corresponding to said data content of the data broadcast to be reproduced does not coincide with each other.

22. A computer-readable recording medium in which a data broadcast reproduction control program for controlling the reproduction of data broadcast including one or more data contents is recorded, said data broadcast reproduction control program allowing said computer to execute the processes of:

receiving data content of data broadcast and related information attached to said data broadcast;

storing the data content of said received data broadcast into a first storage;

reproducing the data content of said received data broadcast;

creating control information for identifying the data content of the data broadcast based on given information included in the data content of said received data broadcast and/or the related information;

storing, during first reception, the data content of the data broadcast acquired from said first storage and the control information corresponding to the data content into a second storage;

determining, during second reception, whether or not the control information stored in said second storage and the control information corresponding to the data content of said received data broadcast coincide with each other; and controlling the reproduction such that the data broadcast is reproduced, using the data content stored in said second storage, when it is determined that the control information stored in said second storage and the control information corresponding to the data content of said received data broadcast coincide with each other, and controlling the reproduction such that the data broadcast is rebooted, using the data content stored in said first storage when it is determined that the control information stored in said second storage and the control information corresponding to said data content of the data broadcast to be reproduced does not coincide with each other.

* * * * *